Figure 1:
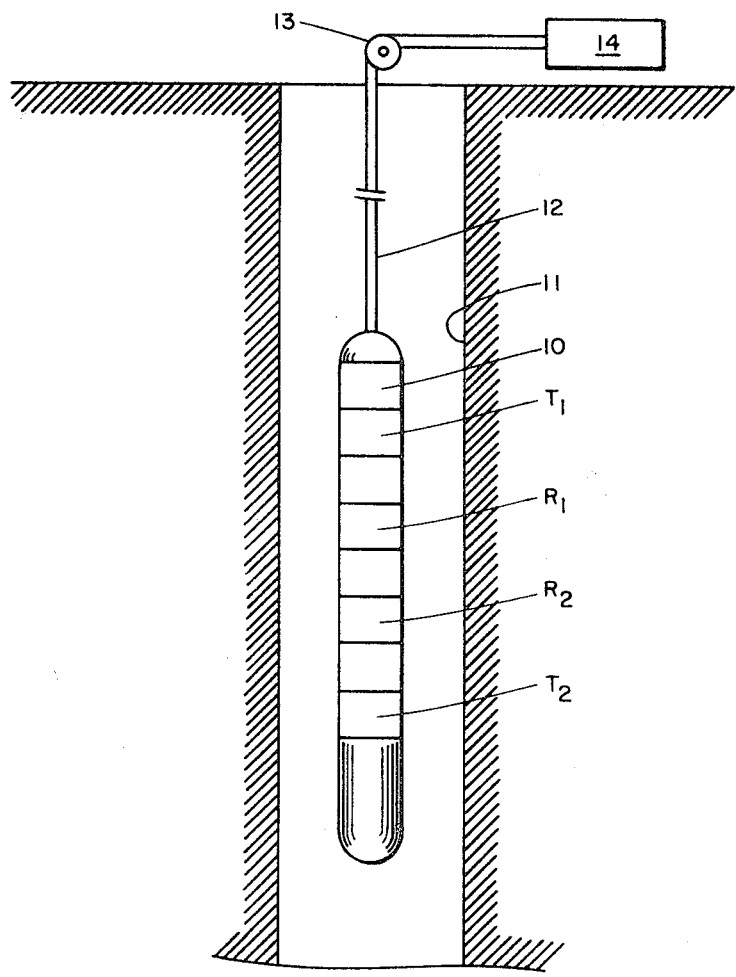

ALLEN W. ENGLE
INVENTOR.

ALLEN W. ENGLE
INVENTOR.

United States Patent Office 3,467,875
Patented Sept. 16, 1969

3,467,875
GATING SYSTEM AND METHOD FOR DISCRIMINATING BETWEEN VALID AND INVALID ANALOG SIGNAL INFORMATION IN ACOUSTIC WELL LOGGING
Allen W. Engle, Houston, Tex., assignor to Dresser Industries, Inc., Dallas, Tex., a corporation of Delaware
Filed Dec. 19, 1966, Ser. No. 603,037
Int. Cl. H03k 5/20
U.S. Cl. 328—147      11 Claims The present invention relates to gating systems and methods for acoustic well logging, and more particularly to systems and methods which can, with discrimination, accept certain input information and supply useful output information derived from the input information by means of a logical process, or reject other input information and supply the useful output information previously stored in the system.

The analysis of subsurface formations by measuring the time interval during which acoustic energy passes between two points in the formations adjacent an acoustic well logging tool has an inherent disadvantage that a substantial amount of extraneous noises is present about the tool which introduces errors into the analysis. Such measurements sometimes represent the time interval between noise and a signal, or simply the time interval between the noises. The noises are due to a variety of sources, such as the noise caused by a logging tool or a cable supporting the tool striking or impacting against the side of the bore hole surrounding the tool or cable. This impact generates extraneous and unwanted noise, generally known as "road noise."

Another problem associated with acoustic well logging is the effect of "cycle skipping" upon the log. The term "cycle skipping" refers to the loss of amplitude of the first arrival of signal at the receiving transducer and the resulting circuit inability to "pick" or select this arrival. This condition can occur very rapidly in a bore hole, especially in holes which are badly washed out. Formations which are fractured have also been difficult to log because of loss of signal strength at the fracture interface.

Various means have been devised in the prior art for eliminating invalid signal information, one such system being described in U.S. Patent No. 3,019,413 for "Discriminating Interval Time Computer for Acoustic Well Logging Systems," being assigned to Dresser Industries, Inc., the assignee of the present invention. The system therein described being particularly adapted for digital analysis, converts two wave train signals into a pair of pulses before transmitting the pulses to the surface. The pulses are then sent through a gating system and pulses falling outside a predetermined interval are rejected.

It is therefore a primary object of the invention to provide an improved gating system and method for rejecting invalid signal information of an analog voltage nature in an acoustic well logging system.

A further object of the invention is to provide an acoustic well logging system in which valid signal information is stored and is compared with signal information of unknown validity to determine if the incoming signal information is valid.

A still further object of the invention is to provide an acoustic well logging system in which analog data is stored, in which a sample from the stored information of unknown validity is compared with previous valid information, after which the incoming signals which have been stored are transferred for recording after ascertainment that the incoming signals fall within a previously determined valid information range.

The system according to the present invention, broadly, comprises a first digital-to-analog converter having valid information stored therein and a second digital-to-analog converter wherein the incoming signal information of unknown validity is converted to analog form. The valid information output of the first digital-to-analog converter is coupled into a summing amplifier and also into a differential amplifier. A predetermined maximum voltage change is also coupled into the two amplifiers. The outputs of the summation amplifier and the differential amplifier are then compared with the information of unknown validity from the second digital-to-analog converter. The outputs from the two comparators are then fed through amplifiers into an "AND" gate, the "AND" gate also having an input from delay circuitry associated with the input logic control. The "AND" gate is only triggered if the information from the digital-to-analog converter No. 2 compares favorably with the outputs of both the summing amplifier and the differential amplifier, the gate also requiring a voltage pulse from the delay circuit. The output of the "AND" gate then causes a storage circuit to transfer its information to the digital-to-analog converter No. 1, such a transfer being an indication that the information of previously unknown validity is valid. Thereafter, the information transferred becomes the new valid signal which will subsequently be transferred from the digital-to-analog converter No. 1 into the summation and differential amplifiers. The system also includes counting circuitry and delay circuitry, such circuitry compensating for unusual sequences of incoming information or malfunctions in the system.

Throughout the description of the invention, the term "valid signal" is used to mean those signals falling within a predetermined range of known valid signal information. "Invalid signals" are defined as those signals having their origin as random noise, due, for example, to the acoustic logging tool impacting against the walls of a bore hole, or those signals which are generated by acoustic energy from the transmitting transducer that do not arrive at the receivers during the selected time interval.

One of the most important applications of the system according to the invention is in the art of acoustic velocity well logging. It is essential that the recording of information derived from an acoustic logging tool represents a true or substantially true picture of the information obtained from the well formations. However, the application of the invention may be made to other systems for purposes where it is essential to reject random information and record only valid signal information.

Figure 2:
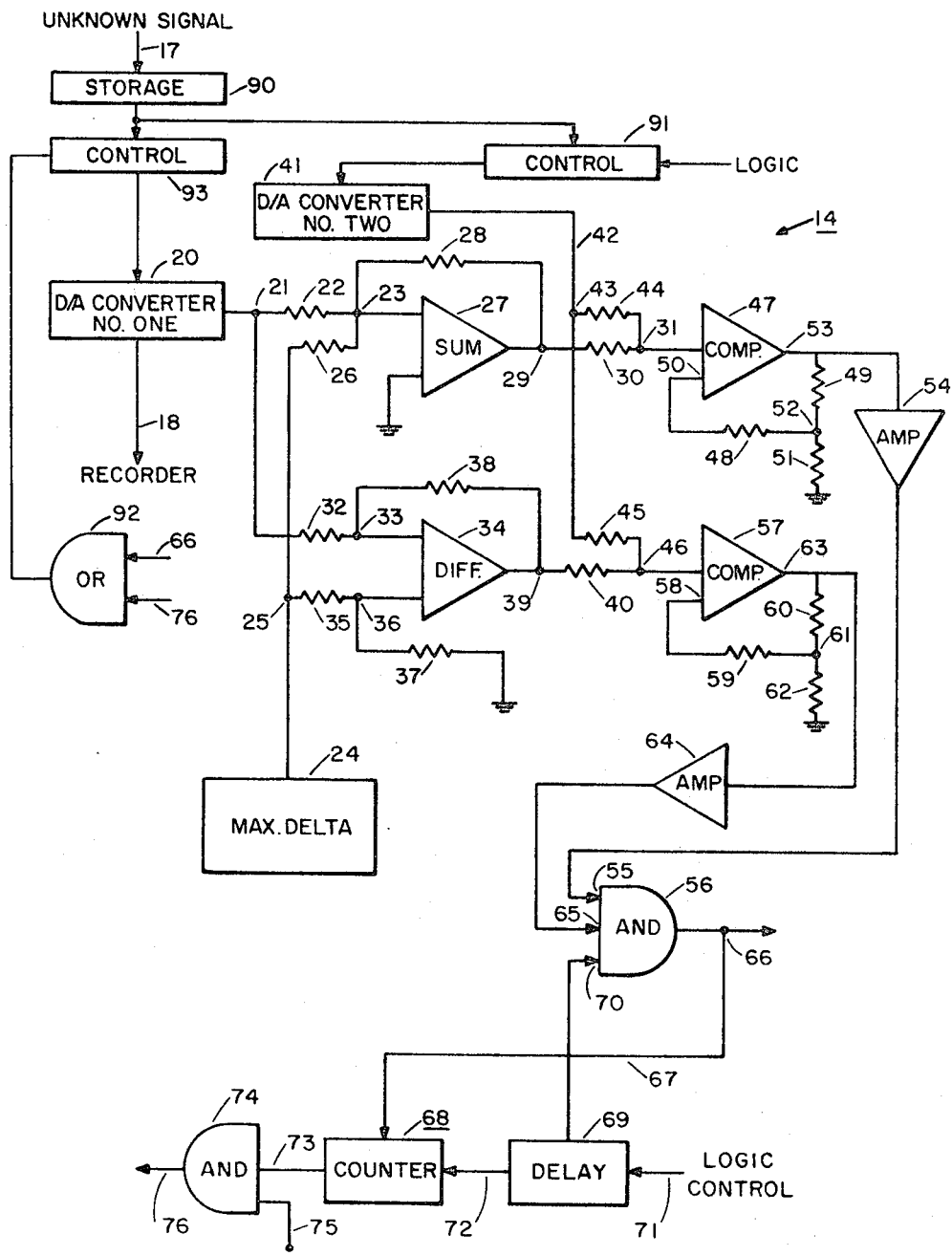

These, as well as further objects, features and advantages which are inherent in the invention will become apparent from the following description, reference being had to the accompanying drawings wherein:

FIGURE 1 is a diagrammatic view of an acoustic well logging tool in a well bore hole in accordance with the invention; and FIGURE 2 is a block diagram representing components of the electronic circuitry embodying the present invention.

Referring now to FIGURE 1, there is illustrated an acoustic well logging tool 10 suspended in a well bore hole 11 from a pulley 13 by a cathode 12. The acoustic well logging tool 10 includes a first transmitting transducer $T_1$, a first receiving transducer $R_1$, a second receiving transducer $R_2$, and a second transmitting transducer $T_2$. The information which is transmitted by the transmitters $T_1$ and $T_2$ and received by the receivers $R_1$ and $R_2$ is coupled through the cable 12 to the surface electronics 14.

It is well known in the prior art to provide bore hole compensation by the use of two transmitters and two receivers through averaging techniques to compensate for washouts in the bore hole or similar anomalies. The bore hole compensating tool with its two transmitters and two receivers requires four successive cycles to complete one interval time measurement. This is due to the method of alternating receivers in order to transmit the received acoustic signals to the surface in their entirety. The sequence of making this one reading is as follows:

(1) Pulse transmitting transducer $T_1$ and measure the time for sound to travel to receiver $R_2$, this time being designated $T_1R_2$.
(2) Pulse $T_1$ again and measure time interval to receiver $R_1$, this time interval being designated $T_1R_1$.
(3) Pulse transmitter $T_2$ and measure the time for sound to travel to receiver $R_1$, this being designated $T_2R_1$.
(4) Pulse transmitter $T_2$ and measure the time for sound to reach receiver $R_2$, this being designated $T_2R_2$.

In the surface equipment these measurements are combined in the manner shown below to obtain one complete measurement of the time interval.

$$T = \frac{T_1R_2 - T_1R_1 + T_2R_1 - T_2R_2}{2}$$

The bore hole compensating tool has spacing between receivers, for example, two feet, and for purposes of recording, this measurement is divided by a factor of 4. Since the log is calibrated in units of microseconds per foot, the factor 4 evolves from, first, the spacing between receivers $R_1$ and $R_2$ being two feet and, second, the interval time is measured twice per cycle. The average time of travel T is thus based upon acoustic energy emitted from above and below the receivers and is an average of two distinct time measurements. This averaging technique minimizes errors due to tilt of the bore hole apparatus in the well bore or caves due to washout, thus greatly improving the accuracy of measurement.

The maximum range of interval time values encountered in a bore hole is generally considered to be from 40 to 200 microsceonds per foot. This range covers the interval time occurring in hard rocks to that in fluid but the extremes are seldom encountered during a logging operation. At a logging speed of sixty feet per minute (one foot per second) and a sampling rate of five pulses per second, at least ten samples will be made before the two foot spaced receiver pair can move entirely out of one zone and into another. Therefore, assuming the extreme range of interval time occurs at an interface, the maximum change per sample is $$\frac{4(200-40)}{10} = 64 \text{ microseconds}$$

It may, therefore, be assumed that any sample showing a change in time from the previous sample greater than the above limit is invalid and is caused by lack of signal, road noise or equivalent malfunction. Thus a valid signal will be defined as an interval time which does not differ from the last valid time by more than some predetermined time.

Thus, the circuitry according to the invention contemplates the use of two receivers and two transmitters, and surface electronic means which provides an averaging basis for bore hole compensation. The average time T, being a signal of unkown validity, will then be coupled into the circuitry according to FIGURE 2.

In FIGURE 2 there is illustrated a first digital-to-analog converter 20, the output of which is coupled to junction 21, into the resistor 22 and junction 23, the junction 23 being coupled to the input of the summing amplifier 27. The maximum delta circuitry 24, being a conventional weighted resistor ladder and switching voltage arrangement which provides a preselected voltage representative of a maximum time delta or change which can still represent a valid signal, is coupled from the junction 25 through resistor 26 to the junction 23. The output voltage from maximum delta 24 is also coupled through junction 25 and resistor 35 to junction 36 into the input of the differential amplifier 34. Junction 21 is also connected through resistor 32 to the junction 33, which is connected to the input of differential amplifier 34. Junction 36 is connected through resistor 37 to ground. Junction 33 is connected through resistor 38 to the output terminal 39 of differential amplifier 34. The junction 23 associated with the summing amplifier 27 is connected through the resistor 28 to the output terminal 29 of the summing amplifier 27. Thus it has been illustrated that a valid signal is transferred from the digital-to-analog converter No. 1 into a summing amplifier 27 and a differential amplifier 34 and a maximum time delta or change represented by a voltage is also coupled into the summing amplifier 27 and differential amplifier 34. The incoming signal of unknown validity which is representative of the average time as discussed in respect to FIGURE 1, is stored in a conventional storage or register 90. Logic circuitry (not illustrated) is coupled into a control circuit 91 which transfers the information stored in circuit 90 into the D/A Converter No. 2. The output of D/A Converter No. 2 is coupled through line 42 to junction 43, junction being connected through resistor 44 to terminal 31 and through resistor 45 to terminal 46. The output from digital-to-analog converter 41 is negative while the output from the summing amplifier 27 and differential amplifier 34 is positive. Thus the polarity as seen at junctions 31 and 46 of any voltage appearing at either terminal is indicative of whether the voltage from junction 29 and junction 39 is larger or smaller than the voltage appearing at junction 43 from line 42. Thus, if the voltage appearing on line 42 is of greater absolute magnitude than the voltage appearing at junction 29 the polarity of the voltage at junction 31 will be negative and vice versa. Likewise if the voltage at terminal 39 is less than the absolute magnitude of the voltage appearing on line 42 the voltage appearing at terminal 46 will have a negative polarity. The voltage from terminal 31 is connected into the input of comparator 47. Terminal 50 of comparator 47 is coupled through resistor 48 to the terminal 52. The output terminal 53 of comparator 47 is connected through resistor 49 to junction 52, junction 52 being connected through resistor 51 to ground. Likewise terminal 46 is connected to the input of comparator 57 and terminal 58 of comparator 57 is connected through resistor 59 to junction 61. The output terminal 63 of comparator 57 is connected through resistor 60 to junction 61, junction 61 being connected through resistor 62 to ground.

Thus it should be appreciated that the comparators 47 and 57 provide a comparison of the signal of unknown validity with the outputs of the summing amplifier 27 and differential amplifier 34.

The resistor values which find particular utility with FIGURE 2 are listed in the following table:

TABLE

| Resistors: | Ohms |
|---|---|
| 22 | 51K |
| 26 | 51K |
| 28 | 51K |
| 30 | 10K |
| 32 | 51K |
| 35 | 51K |
| 37 | 51K |
| 38 | 51K |
| 40 | 10K |
| 44 | 10K |
| 45 | 10K |
| 48 | 10K |
| 49 | 470K |
| 51 | 10 |
| 59 | 10K |
| 60 | 470K |
| 62 | 10 |

NOTE: Resistors should be matched, 1%.

As is described elsewhere herein, valid signal information is coupled out of the digital-to-analog converter No. 1 through line 18 into a conventional recorder, for example, a photo recorder or tape recorder.

The output terminals 53 and 63 of the two comparators are connected through standardizing amplifiers 54 and 64 into terminals 55 and 65, respectively, of the conventional "AND" gate 56. The delay circuitry 69, being driven by logic control circuitry through line 71, is also connected to the gate 56 through input terminal 70, thus providing a timing means for the gate which finds utility in the logic control as is well known in the art. In the preferred embodiment, the inputs to the gate should all have negative polarity to trigger gate 56 and thus have an output at terminal 66. Terminal 66 of "AND" gate 56 and terminal 76 of "AND" gate 74 are the inputs to the "OR" gate 92, the output of which causes the control circuit 93 to transfer the stored information in circuit 90 into D/A Converter No. 1. Thus, if a negative voltage appears at all of the junctions 55, 65 and 70, the "AND" gate 56 is triggered on and a signal is passed through junction 66 into the "OR" gate 92. When this occurs, the storage circuit 90 transfers its stored signal into the digital-to-analog converter No. 1.

The conventional delay circuitry 69 is also connected through line 72 to the counter circuitry 68. Terminal 66, the output of the "AND" gate 56, is also connected to the counter circuitry 68. The output of counter 68 is connected through line 73 into an "AND" gate 74, having another input line 75 to which a B+ supply is connected (not illustrated). The output line 76 of "AND" gate 74 is also connected into the "OR" gate 92. The counter circuitry 68, although not illustrated as such, comprises a series of flip-flop circuits, well known in the art, such that a signal from the delay line 72 causes the counter to commence counting. Ordinarily, when the "AND" gate 56 indicates that a signal should be classified as valid, a pulse from terminal 66 is coupled through line 67 to clear the counter 68, thus resulting in the counter ceasing to count. However, it is possible for this system to reject a succeeding valid interval time measurement if the prior reading or readings have been rejected. Thus, as the instrument moves past formations of different interval time values, the new valid readings can lie outside the range. To handle such situations, the counting circuitry uses three flip-flop circuits connected in a count-up-to-six configuration. If a clearing signal is not developed at terminal 66, the counter will continue to count until the count of six is reached. At this time the counter output will trigger the "AND" gate 74 and this gate will then trigger the "OR" gate 92, whereby the data stored in circuit 90 will be transferred to digital-to-analog converter No. 1. In this manner, the system automatically starts accepting new data.

It should be appreciated that "road noise" may cause the system to "lock-in" on data that is incorrect. Under such conditions, the operator has merely to reduce the surface gain and/or increase the range of the system. As soon as logging conditions return to normal the maximum range and surface gain can be returned to the normal values.

While particular embodiments of the present invention have been illustrated and described, it is apparent that changes and modifications may be made without departing from this invention in its broader aspects. For example, while there have been shown three inputs to the first "AND" gate 56, along with the associated delay and counter circuitry, it is contemplated that only the inputs from the two comparators to the gate 56 are necessary in one embodiment of the invention. Likewise, it should be appreciated that while the inputs to the comparators are illustrated and described as coming in on one input line to each of the comparators, there could also be two or more input lines to the comparators for thus comparing the signals. Therefore, the aim in the appended claims is to cover all such changes and modifications as fall within the true spirit and scope of this invention.

What is claimed is:
1. A system for accepting a valid signal voltage within a predetermined amplitude range comprising:

(a) first storage means having at least one input terminal and first and second output terminals, whereby a valid signal voltage can be received from said at least one input terminal and stored in said first storage means;
(b) summing amplifier means having input means and an output, said input means being connected to said first output terminal of said first storage means;
(c) differential amplifier means having input means and an output, said input means of said differential amplifier being connected to said first output terminal of said first storage means;
(d) a voltage source having a predetermined amplitude connected to said input means of said summing amplifier means and to said input means of said differential amplifier means, whereby the voltage at said output from said summing means comprises a voltage indicative of the amplitude sum of said valid signal voltage and said predetermined voltage, and the voltage at said output from said differential means comprises a voltage indicative of the amplitude difference between said valid signal voltage and said predetermined voltage;
(e) first comparator means having input means and an output, said input means of said first comparator means being connected to the output of said summing means;
(f) second comparator means having input means and an output, said input means of said second comparator means being connected to the output of said differential means;
(g) second storage means having an output terminal and at least one input termial, whereby an unknown signal voltage can be received at said at least one input terminal of said second storage means and stored in said second storage means, said output terminal of said second storage means being connected to the input means of said first and said second comparator means and also being connected to said at least one input terminal of said first storage means, whereby an unknown signal voltage from said second storage means can be compared with the output voltage from said summing means and can be compared with the output voltage from said differential means; and
(h) first gating means connected to the outputs of said first and second comparator means, respectively, whereby said first gating means provides an indication of whether said unknown voltage is within a predetermined amplitude range of said valid signal voltage.

2. The system according to claim 1 wherein said indication from said first gating means is coupled to said first storage means, whereby said unknown signal voltage is transferred from said second storage means to said first storage means whenever said unknown signal voltage is within a predetermined amplitude range of said valid signal voltage.

3. The system according to claim 2, including in addition thereto, recording means connected to said second output terminal of said first storage means.

4. The system according to claim 3 wherein said first gating means has at least three inputs and including in addition thereto logic-driven delay means connected to one of said first gating means inputs.

5. The system according to claim 4, wherein said first gating means comprises an "AND" gate, whereby said gate is only gated whenever there simultaneously exists a voltage from said delay means, a voltage from said first comparator means and a voltage from said second comparator means.

6. The system according to claim 5, including in addition thereto, counter means driven by said delay means, and a second gating means responsive to said counter means, whereby said second gating means provides an indication of system malfunction.

7. The system according to claim 6 wherein said second gating means is coupled to said second storage means, whereby said unknown signal voltage is transferred to said first storage means after said counter means reaches a predetermined count.

8. The system according to claim 7 wherein said counter means is connected to the output of said first gating means, whereby said counter ceases to count after receiving a clearing signal from the output of said first gating means.

9. A method for accepting only valid signal information comprising:
  (a) adding a predetermined voltage to a known valid signal voltage;
  (b) subtracting said predetermined voltage from said known valid signal voltage;
  (c) comparing a signal voltage of unknown validity with the sum of said predetermined voltage and said known valid signal voltage;
  (d) comparing said signal voltage of unknown validity with the difference between said predetermined voltage and said known valid signal voltage;
  (e) coupling the results of both of said comparisons to a gate, whereby said gate provides an indication of acceptance for valid signal voltages and an indication of rejection for invalid signal voltages.

10. The method according to claim 9, comprising the additional steps of:
  (a) storing said signal of unknown validity during said comparisons; and
  (b) causing said stored signal to be recorded as valid signal information whenever said gate provides an indication of validity.

11. The method according to claim 10, comprising the additional step of coupling a voltage through a counter to cause said stored signal voltage to be recorded as valid signal information after said counter has counted to a predetermined number.

References Cited
UNITED STATES PATENTS 3,019,413   1/1962   Brokaw _____ 340—15.5

JOHN J. HEYMAN, Primary Examiner

S. D. MILLER, Assistant Examiner

U.S. Cl. X.R.

235—150.5; 328—151, 163; 340—15.5, 18